C. E. BOWER.
ROTARY ADDRESSING AND DUPLICATING MACHINE.
APPLICATION FILED JAN. 7, 1915.
1,317,683.
Patented Oct. 7, 1919.
4 SHEETS—SHEET 3.
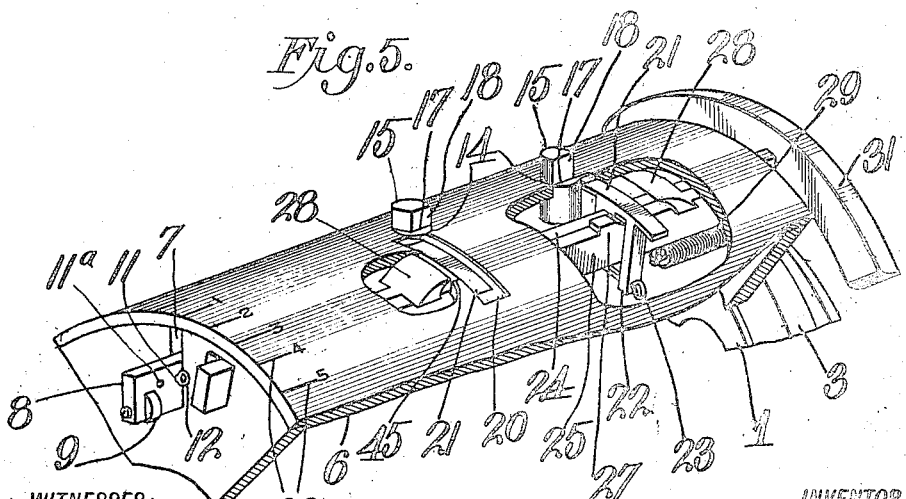

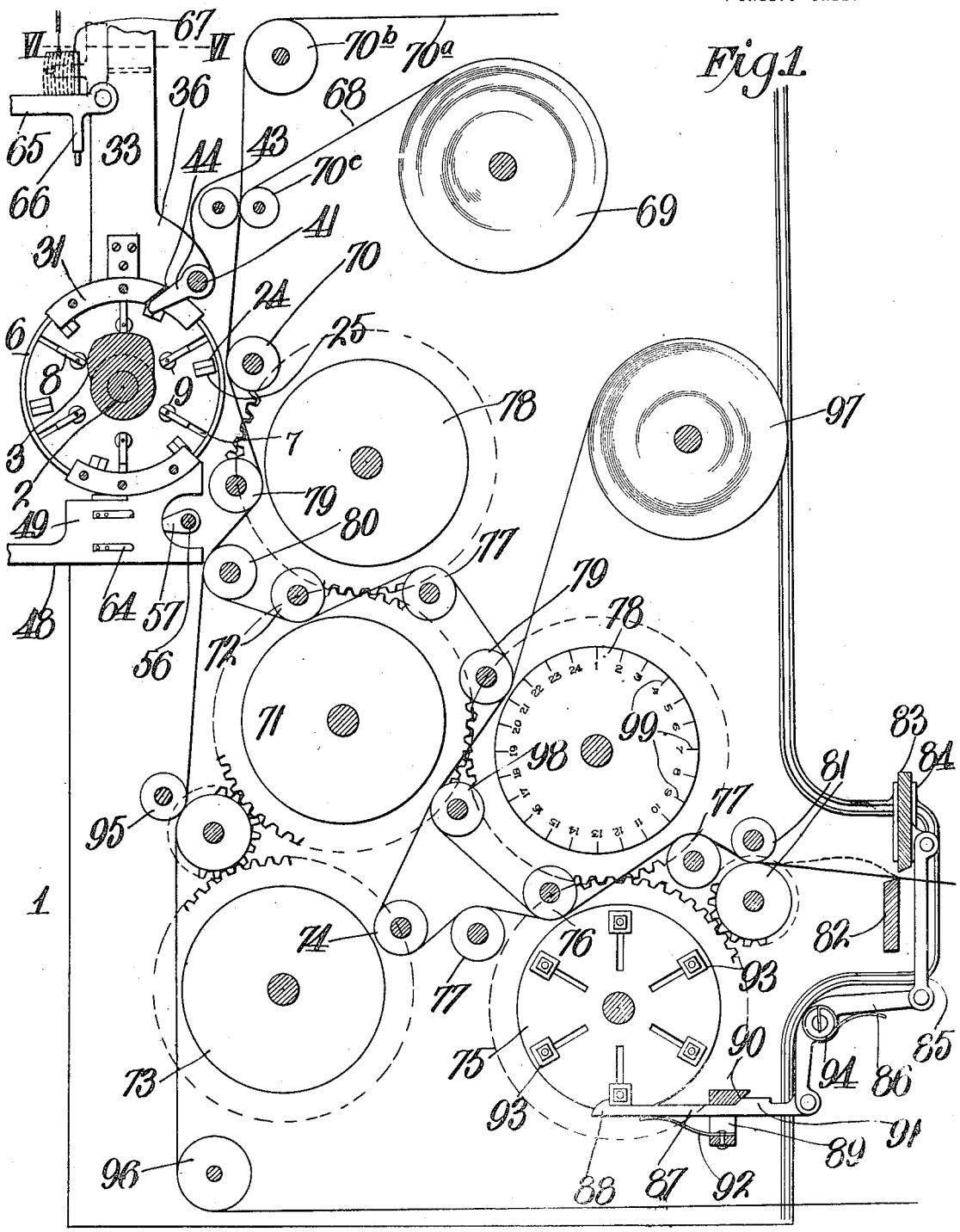

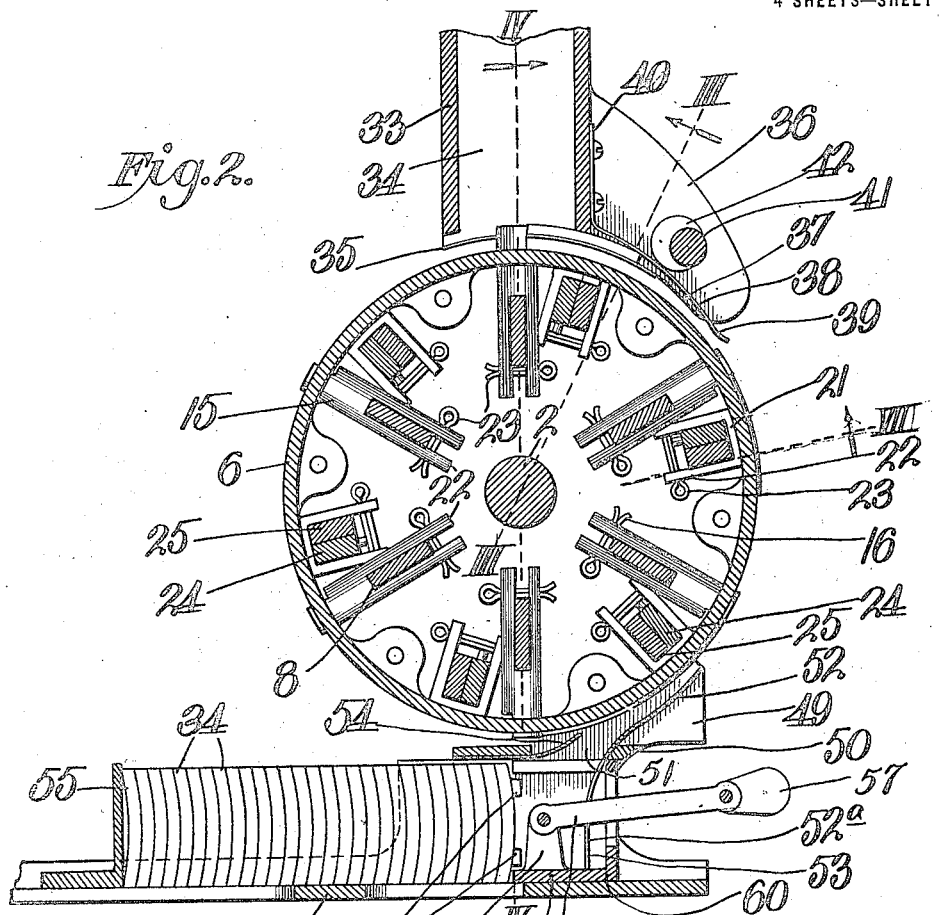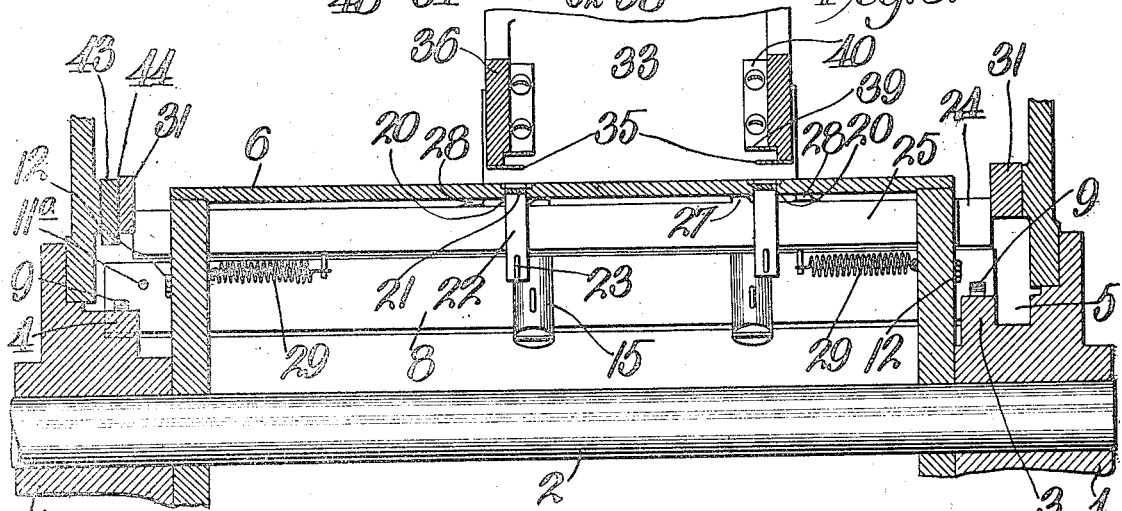

C. E. BOWER.
ROTARY ADDRESSING AND DUPLICATING MACHINE.
APPLICATION FILED JAN. 7, 1915.

1,317,683.

Patented Oct. 7, 1919.
4 SHEETS—SHEET 4.

WITNESSES:
Frank R. Glow
H. C. Rodgers

INVENTOR
C. E. Bower
BY
George F. Hooper
ATTORNEY

UNITED STATES PATENT OFFICE.

CLARENCE E. BOWER, OF DENVER, COLORADO.

ROTARY ADDRESSING AND DUPLICATING MACHINE.

1,317,683.　　　Specification of Letters Patent.　　Patented Oct. 7, 1919.

Application filed January 7, 1915. Serial No. 955.

*To all whom it may concern:*

Be it known that I, CLARENCE E. BOWER, a citizen of the United States, residing in the city and county of Denver and State of Colorado, have invented certain new and useful Improvements in Rotary Addressing and Duplicating Machines, of which the following is a specification.

This invention relates to rotary addressing and duplicating machines of that class wherein paper running from a roll receives impressions successively from address plates and is subsequently engaged by one or more rotating printing plates to produce an impression or impressions near each printed address, and my object is to produce a machine of the character outlined which operates efficiently at high speed and is of simple, strong, durable and compact construction.

With this general object in view, the invention consists in certain novel and peculiar features of construction and organization as hereinafter described and pointed out in the appended claims; and in order that it may be fully understood reference is to be had to the accompanying drawings, in which:—

Figure 1, is a vertical section taken on the line I—I of Fig. 4, of a machine embodying my invention, the figure also disclosing other associated elements for the guidance and severance of a paper web, in section.

Fig. 2, is an enlarged vertical section taken on the line II—II of Fig. 4.

Fig. 3, is a section on the line III—III of Fig. 2.

Fig. 4, is a section on the line IV—IV of Fig. 2.

Fig. 5, is a fragmentary perspective view of the rotary address printing cylinder.

Figure 6:
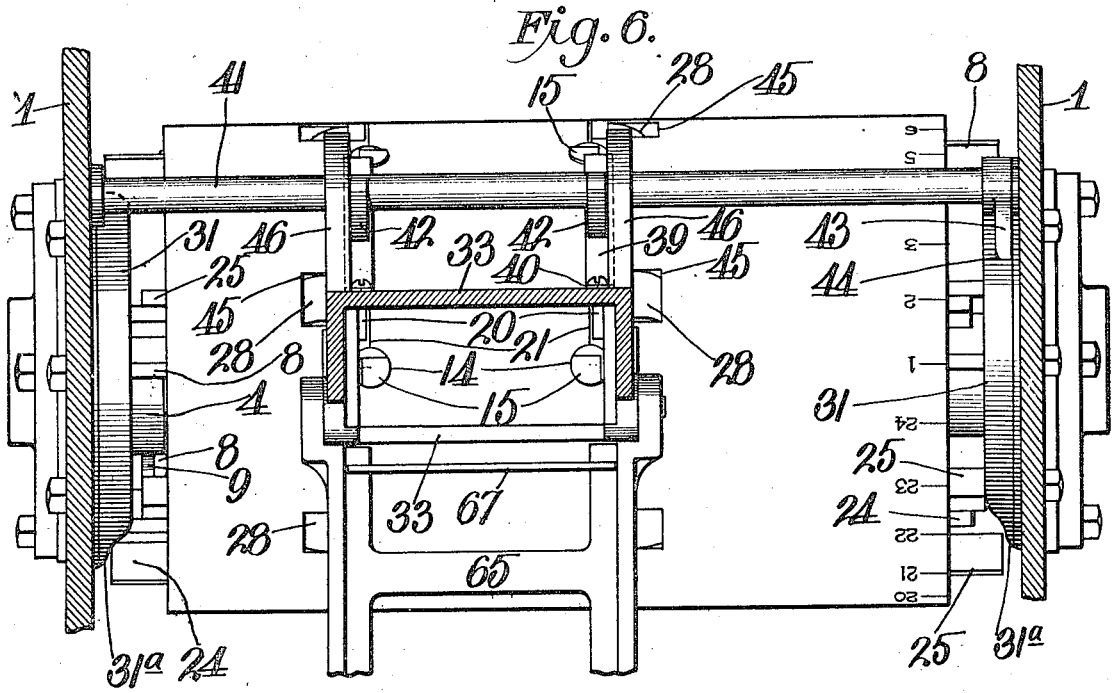
Fig. 6, is a horizontal section on the line VI—VI of Fig. 1.

In the said drawings, a suitable frame 1 provides a journal for a transverse shaft 2 adapted to carry a drive belt or its equivalent, not shown. The sides of the frame are provided around the shaft 2 with stationary cams 3 and 4, the cam 3 being spaced inward from its respective side of the frame so as to provide the interposed space 5 for a purpose which hereinafter appears. Secured rigidly on the shaft between the cams is a hollow cylinder 6, provided with a plurality of radial slots 7. Extending through alined slots 7 in opposite ends of the cylinder are bars 8, each equipped with a pair of rollers 9 adapted normally for travel on the cams 3 and 4, and at the end adjacent cam 3, each bar is provided with a notch 10 wide enough to receive the cam 3, when it is desired to secure one of said bars in its inoperative position.

Each bar is provided with pairs of holes 11 and 11$^a$, for the reception of cotters 12 to bear against opposite ends of the cylinder to prevent endwise movement of the bars, the cotters engaging holes 11 when the bars occupy their operative positions, as shown in full lines Fig. 4, and the holes 11$^a$, when the bars occupy their inoperative positions, as shown in dotted lines, same figure. It will be noted that springs 13, secured to the cylinder, hold the bars pressed radially inward, and that when the bars occupy their operative positions the springs yield to accommodate the outward movement imparted to the bars by the cams, and reverse the movement of the bars as they pass the high points of the cams in the rotation of the cylinder.

It will likewise be noted that when the bars are adjusted to inoperative position, cam 3 is free to play through notches 10, and cam 4, is beyond the vertical plane of the unnotched ends of the bars, hence the bars remain at the inner ends or bottoms of the notches. It will also be noted that the springs 13 maintain the bars at the inward limit of their radial movements after said bars have been adjusted endwise to inoperative position, as at such time the cams 3 and 4, cannot engage the bars, the former being received by notches 10 and the cams 4, lying beyond the vertical plane of the adjacent ends of the bars.

In alinement with each pair of opposite slots 7, the cylinder is provided with a pair of openings 14, in which slidingly fit radial pins 15 for forcing the address plates out of the magazine. Each pair of pins 15 is longitudinally slotted for the reception of one of the bars 8, and cotters 16 secured to the pins, engage the inner edges of the bars and thus insure synchronous radial movement of the pins with their respective bars. When the rollers 9 of the bars are traveling upon the crests or high portions of the cams the pins are projected beyond the surface of the cylinder, as indicated in Figs. 4 and 5, and the projecting portions of the pins are cut away at the front sides to provide the flat faces 17 and outwardly facing shoulders 18 respectively.

Forward of each set of pins with respect to the direction of rotation, the cylinder is provided with a pair of peripheral openings 20, and arranged in radial alinement with said openings and standing normally within the cylinder is a pair of push plates 21 having inwardly-projecting bifurcated legs 22 connected at their inner ends by cross pins or cotters 23.

Extending longitudinally through the cylinder and parallel with and adjacent each bar 8 is a pair of bars 24 and 25 fitting flatwise together and extending through the openings 26 in the ends of the cylinder. The bars 24 and 25 are each provided on their outer edges with cam lugs 27, and jaws 28, and each of said bars is connected by a retractile spring 29 to an end or other fixed part of the cylinder, the pull of said springs tending to cause the said cam lugs to act as wedges for forcing the plates 21 outward through the circumferential openings 20, for the purpose of ejecting the printing plates as hereinafter explained, and to effect the retraction of the push plates, springs 30 may be employed, these springs being preferably attached to the cross pins 23, and bearing at their free ends against the associated pair of plates 24 and 25. To effect the withdrawal of the jaws 28 preliminary to receiving a printing plate between them, and to effect the release of such plates, curved cam bars 31 and 32 respectively, are secured to the sides of frame 1, and in the circumferential path of travel of the bars 24 and 25.

Preferably the cam bars 31 are vertically above the cam bars 32, and supported in any suitable manner vertically above the cylinder between the cam bars, is an upright magazine 33, within which are stacked one upon the other, curved address plates 34 corresponding to that of the circumference of the cylinder. The stack of printing plates rests upon supporting flanges 35 projecting inward from the lower edges of the sides of the magazine, which flanges are curved to parallel the circumference of the cylinder and spaced outward from the latter a distance about equal to the thickness of the address printing plates.

The supporting flanges 35 project beyond the rear side of the magazine to support each address plate during its withdrawal from the magazine until the plate is withdrawn from under the remaining plates of the stack, and said projecting ends underlie rearwardly-projecting arms 36 of the magazine, which arms are undercut in their lower inner edges at 37, to provide inwardly-facing shoulders 38 which form bearings for spring plates 39 terminating in upwardly projecting ends 40, secured to the back of the magazine. The spring plates 39 are engaged by the upper sides of the address printing plates as the latter are being withdrawn from the magazine for the purpose of forcing the address plates toward the cylinder so that they may be gripped and held upon the cylinder by the jaws 28 as hereinafter explained.

A rock shaft 41 is journaled in the arms 36 and provided with eccentric enlargements or cams 42 which engage the upper sides of the springs 39, and to effect the operation of the rock shaft, it is provided with a crank arm 43 adapted to be engaged and pushed aside by the bars 8 in successive order as the cylinder revolves, as will be seen by reference to Fig. 1. The springs 39 through their outward pressure on the eccentric or cam portions of the rock shaft, return the arm to operative position immediately after the passage of the actuating guide bar which passes over cam 3. It will thus be seen that a cylinder provided with six guide bars will operate the rock shaft six times in each revolution, provided all of the bars are adjusted to such positions that their rollers 9 must travel upon the cams 3 and 4. To accommodate the crank arm 43, the cam 31 is provided with a recess 44 in its outer side, the arrangement being such that each bar 8 just before passing clear of the cam 3 shall engage and start to operate said crank arm.

Each bar 8 adjusted to inoperative position as hereinbefore explained, is prevented from moving endwise by the insertion of the cotters 12 in the slots 11ª so that said cotters shall engage the opposite ends of the cylinder and the bars are disposed in inoperative position for the purpose of withdrawing their associated pins 15 sufficiently to insure their passage below the undermost of the stack of printing plates.

In the rotation of the cylinder in the direction indicated by the arrow Fig. 2, it will be apparent that each pair of the pins projected substantially beyond the periphery of the cylinder as shown in Figs. 2 and 4, will, in passing under the magazine force the undermost printing plate ahead of it upon the flanges 35 against the springs 39.

As the advanced end of each plate clears the free end of the flanges 35, the springs 39 will begin to press the plate inwardly toward the cylinder and as the actuating pins are passing under the rear wall of the magazine the bar 8 carrying said pins, strikes and begins to operate the crank arm, the operation of the crank arm being completed about the moment the pins attain the radial planes of the free ends of flanges 35. The operation of the crank arm effects rotation of the rock shaft to cause the eccentrics 42 thereof to press downwardly on springs 39 and snap the rear end of the printing plate down upon the cylinder, it being obvious that prior to this the advanced end of said plate has been pressed against the cylinder by the spring 39. At the instant the plate is thus flatly fitted against the cylinder, it is gripped and securely held by the jaws 28 under the pull of the spring 29, as at that moment one pair of the bars 24 and 25 rides off the cam bars 31 and therefore permits the springs 29 to effect simultaneous endwise movement of the bars and inward or approaching movement of the jaws 28 thereof.

Figure 7:
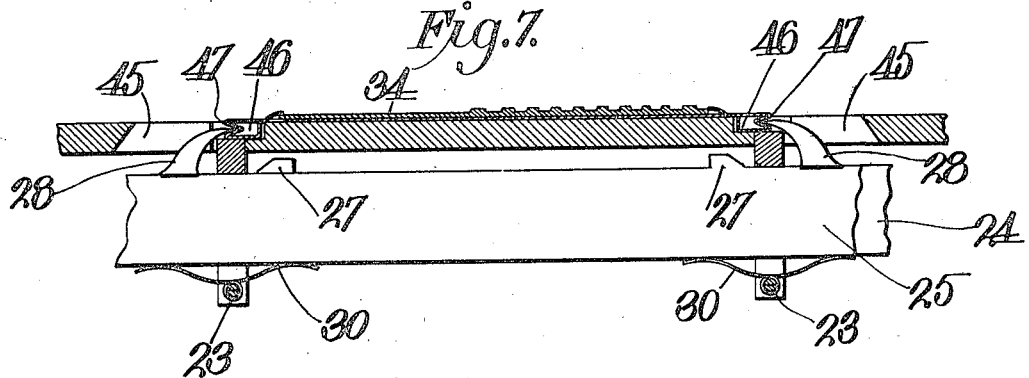
Fig. 7, is a section on the dotted line VII of Fig. 2.
Figure 8:
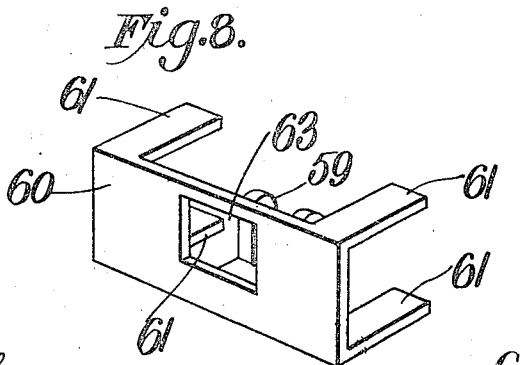
Fig. 8, is a perspective view of the collecting magazine plunger.

As each bar 8 starts to ride over the cams 3 and 4, the adjacent pair of bars 24 and 25 in advance of said bar (see Fig. 1) is carried into engagement with the tapered ends 31ᵃ of cams 31 and is moved endwise thereby against the resistance of springs 29, to effect sufficient separating movement of the jaws to accommodate an addressing plate between them, as will be readily understood by reference to Figs. 5 and 6, and to accommodate the jaws, the openings 20 are formed with extensions 45, as shown in Figs. 5, 6 and 7.

As it is desirable that the printing plates shall fit flatly upon the cylinder, it is necessary to provide said plates with depending stiffening ribs 46 against which pressure may be applied by the pins 15, to feed the plates from the magazine. These ribs enter the openings 20 and overlie the push plates 21, when a printing plate is automatically fitted to the cylinder as explained, and are provided with V-shaped grooves 47 in their outer sides to receive the jaws 28, which act as wedges to clamp the plates immovably to the cylinder.

In the revolution of the cylinder the bars 24—25 are moved endwise twice by springs 29, and contrariwise by the cam bars 31 and 32, the latter imparting more extended movement than the former for the purpose of causing cams 27 to engage and force the push-bars outward against the overlying printing plate to insure the instantaneous dislodgment thereof from the cylinder. By reference to Figs. 1, 4 and 7, it will be understood that as a pair of the bars 24—25 clear cam bars 32, the springs 29 operate the bars to effect approaching movement of the jaws and receding movement of the cams 27, from the push plates; that cam bars 31 reverse these movements to permit a printing plate to drop between the jaws; that the springs again effect receding movement of the cams 27 from the push plates and approaching movement of the jaws to cause the latter to engage the grooves 47 of the printing plate deposited upon the cylinder while the cams 31 are holding the jaws apart, and that the reëngagement of the bars 24—25 with cams 32 again effects separating movement of the jaws to disengage them from the printing plate, this movement of the bars induced by cams 32 being sufficiently extended to cause the cams 27 to act as wedges between bars 24—25 and the push plates for the purpose of overcoming the resistance of springs 30 and imparting radial outward movement to said push plates, this action forcing the printing plate outwardly until its end ribs 46 are beyond the periphery of the cylinder, as will be readily understood.

To collect the printing plates as they are successively dislodged from the cylinder, I have provided a collecting magazine which is mounted in any suitable manner in frame 1 below the cylinder, as shown clearly in Fig. 1. This magazine is of skeleton form and consists preferably of a bottom 48 of any suitable length, a pair of side walls 49, and a top 50 provided with a receiving opening 51, the side walls preferably extending upward above the top and being curved at their upper edges to conform approximately to the curvature of the cylinder.

To cause each plate as dislodged to slide edgewise through the receiving opening and assume approximately an upright position in the collecting magazine, I provide a chute 52 which connects the side walls and extends into the receiving opening at the rear end of the same, at which point the chute is narrowed to a tongue 52ᵃ, which extends almost directly downward nearly to the bottom of the magazine, the tongue being considerably narrower than the magazine for a purpose as hereinafter appears, and being provided with a central bifurcation or slot 53, for a purpose presently explained.

To guard against the possibility of the plates moving edgewise approximately parallel with the periphery of the cylinder until they strike the forward portion of the top of the magazine, a deflector 54 is secured to said top and curves upwardly and rearwardly toward the cylinder, this deflector tilting an encountering plate downward so that it shall drop edgewise to the bottom of the magazine and against the rearmost of the plates which have been previously positioned upright in the magazine.

The first plate deposited in the magazine will be prevented from falling forward by a slidable head block 55, which fits in the magazine with sufficient friction, or which is sufficiently heavy, to resist sliding under the impact of the plate but which will yield under sufficient pressure applied on the plate, to provide space for the accommodation of the next plate which enters the magazine.

To impart this movement to the address plate or plates behind the head block, the following mechanism is provided; 56 is a shaft journaled in the sides of the frame and adapted to be revolved by any suitable means, not shown, and said shaft is provided with a crank 57, connected by a link 58, to a double post 59, of a plunger 60, mounted to reciprocate in the magazine. The bifurcation or slot 53 in tongue 52$^a$, accommodates link 58 and post 59 in the reciprocatory action thereof.

The plunger comprises a rear wall and forwardly projecting corner arms 61. It is also provided with a forwardly projecting portion 62 constituting a base for the post 59. The rear wall of the plunger is provided with an opening 63 through which the link 58 extends and into which the crank 57 projects at times, as shown in Fig. 2, though it is obvious that these parts may be so proportioned that it shall be unnecessary for the crank to enter said opening.

In Fig. 2, the plunger is shown in its advanced position, and in attaining such position the front ends of its arms 61 engages the last printing plate which entered the magazine and forced it to an upright position against the previously positioned plates, and then imparted to all of the plates a forward movement equal to the thickness of the ribs 46 of one of said plates. As the plates are thus advanced the last one passes and presses outwardly spring retainers 64 secured to the outer sides of the magazine and projecting into the same, as indicated in Figs. 1 and 2, said retainers snapping back into the magazine immediately to maintain the last plate in its upright position. As the retainers thus return to normal or operative position, the rotation of the shaft slides the plunger backward until the front ends of its arms are disposed rearwardly of the vertical plane of the receiving opening of the magazine. As this result is attained, another plate drops edgewise into the magazine, and the rotation of the shaft causes the plunger to again advance and thus properly position the new plate beyond the retainers and incidentally force all of the plates and the head block 55 forwardly, these actions being repeated as long as the machine is in operation, as will be readily understood.

All or any desired number of the address printing plates in the collecting magazine may be withdrawn in a body, and when it is desired to use them again they are turned to a vertical position with their convex faces upright—after being removed from engagement with the head block—and deposited in the magazine 33 upon plates previously placed therein or upon the supporting flanges 35, in the event said magazine is empty.

As a convenient means for depositing a stack of plates in the supply magazine 33, a holding rack 65 is pivoted to said magazine at the upper end of the rear wall thereof, and said rack is provided with a pair of grooved arms 66 within which fits slidingly a normally upright plate 67, of such proportion that when the rack is swung to an upright position, said plate swings into the magazine over the rear wall thereof. The operator of this rack after a stack of plates are placed upon it as indicated by dotted lines, in Fig. 1, with the concave face of the rearmost plate against the plate 67, disposes the stack within the magazine above the rear wall thereof. The plate 67 is then slid from under the stack to permit the latter to drop into the magazine upon plates therein or upon the flanges 35, if the magazine is empty.

To utilize the printing plates in printing addresses upon a traveling web of paper 68 from a roll 69, journaled in the frame 1, a roller platen 70 is disposed adjacent the rear side of the cylinder. Any suitable inking mechanism, not shown, may be provided to ink the type of the printing plates, and the web will be caused to travel at the same speed as the cylinder, by any suitable gearing, not shown. Preferably an inking ribbon 70$^a$ will be employed for transferring the impressions of the address printing plates onto the paper, interposed between the cylinder and the paper where the latter runs over platen roller 70. The ribbon is shown as guided over a roller 70$^b$, and between a pair of guide rolls 70$^c$ interposed between the platen 70 and said roller 70$^b$. The guide rollers 70$^c$, also constitute a guide for the paper above the platen.

As illustrating a construction whereby the paper web may receive an imprint or impression adjacent each address printed on the paper web, reference is to be had to Fig. 1, in which 71 is a printing cylinder arranged to coöperate with a platen 72 in producing imprints or impressions upon the same side of the web of paper as and following each address printed thereon. In said figure, applicant also illustrates a printing cylinder 73 and a platen 74, and a printing cylinder 75 and a platen 76, for printing upon the same side of the paper. The cylinder 73 may be used conveniently for printing matter in contrasting color to the imprint made by cylinder 71, and the cylinder 75 may be utilized to print a signature or name at the bottom of each communication, it being of course understood that with each cylinder and its platen will be associated any suitable inking mechanism, not shown.

As the paper web travels rapidly through the machine, it is essential to employ blotter rolls over which the paper will pass to dry each imprint. The blotter rolls are numbered 77 and are journaled in the frame 1, the arrangement of the printing cylinders, platens and rollers being such as to make the machine as small and compact as possible.

If it is desired to print upon the back or opposite side of the web of paper, printing cylinders 78 and platens 79 may be employed conveniently, as shown in Fig. 1, being of course equipped with inking mechanism, not shown, and having associated blotter rolls 80.

The web of paper extends from the last blotter roll to and between a pair of feed rolls 81, and thence between a stationary knife 82 and a reciprocatory knife 83, operating in a guide 84 secured to the frame. The knife 83 is pivotally connected by a link 85, to a bell crank lever 86, pivotally connected to a catch 87, provided with a hook end 88, and extending through a guide 89 provded with an inclined face or cam 90 for coöperative engagement with cam 91 on the catch, the latter being held pressed yieldingly upward by a spring 92 secured to the guide. In the revolution of the cylinder 75 adjustable plates 93 thereon successively engage the hook 88 and impart endwise movement to the catch, this movement being slight because the coöperating cams 90 and 91 cause the catch to swing downward and effect disengagement between its hook 88 and the actuating plate 93. The movement imparted to the catch is just sufficient to cause the knife 83 to shear upon the knife 82, and as this occurs the continuously moving web through the opposition of the depressed knife 83 buckles or bows upwardly slightly, as indicated in dotted lines, so that as the knife 83 is reëlevated, the paper straightens out between the knives and continues its onward movement. To reëlevate the knife instantly after each cutting operation, a spring 94 is employed, the spring being shown as fastened at one end to the pivot of the bell crank lever and pressing upwardly at its opposite end against the said lever.

The plates 93 correspond in number and spacing to the bars 8, so that the paper shall be severed between each signature and the adjacent address. The plates 93 are adjustable inwardly to inoperative position as regards the catch 87, the ones so adjusted of course corresponding to the bars 8 which are likewise adjusted to inoperative positions, as hereinbefore described.

The inking ribbon 70ᵃ will preferably continue with the web of paper 68 around the platen 79 and the adjacent blotter roll 80, and from the latter will preferably extend between a pair of feeding and guiding rolls 95 and thence around a guide roll 96. If the inking ribbon is endless as is the preferred construction, though not shown, it will extend rearwardly from roll 96 in a plane below guide 89, to a plane substantially rearward of the cutting mechanism, and then be guided upwardly and forwardly to roll 70ᵇ, additional feed rolls, not shown, being employed if necessary to coöperate with the rolls 95, in feeding the ribbon.

If it is not desired to print upon the back of the web of paper, the printing cylinders 78 may be permitted to rotate inoperatively, that is to say, they will not be provided with printing plates or type and hence cannot come into contact with the web of paper. If it is desired to print upon another web of paper through the medium of one of the cylinders 78 and associated platens 79, a second roll of paper 97, may be journaled in the frame, and the paper led between the underlying cylinders 78 and the adjacent platen, and extend therefrom flatly against the other web, to a blotter roll 98, and from the latter between the first-named web and the platen 76 associated with what may be termed the signature or name cylinder 75. From said platen said web extends with the other web over blotter roll 77 and between feed rolls 81 to the cutting knives, so that the latter may cut the webs simultaneously.

Any suitable means may be employed to enable the machine to position the printing plates upon the various rolls with proper relation to each other and the address printing plates, to avoid the production of imprints at improper points upon the paper. A simple and efficient method is to provide the address printing plate cylinder 100 and all of the other cylinders with correspondingly spaced marks 99, as indicated in Fig. 5, and on one of the cylinders 78 of Fig. 1. As the functions of the various parts of the machine have been explained in connection with the detailed description of such parts, no recapitulation of the operation of the machine is necessary.

From the above description it will be apparent that I have produced an address printing machine possessing the features of advantage enumerated as desirable, and I wish it to be understood that while I have illustrated and described the preferred embodiment of the invention, I reserve the right to make all changes in form, proportion, construction and arrangement of the various parts which fall within the spirit and scope of the appended claims.

I claim:

1. In an address printing machine, a rotatable carrier, means for fitting an address printing form flatly on the carrier, a pair of bars arranged side by side and extending slidingly through and mounted upon said carrier and each provided with an inwardly-facing jaw, yielding means for imparting reverse endwise movement to said bars to cause said jaws to engage and clamp a printing form firmly to the carrier, and fixed or stationary cam-bars for reversing the movement of the first-named bars to effect the release of the printing form.

2. In an address printing machine, a rotating cylinder, means for fitting an address printing plate flatly on the cylinder, a pair of bars arranged side by side, mounted upon and extending slidingly through the cylinder and each provided with an inwardly facing jaw and an outwardly facing cam, radially movable push plates carried by the cylinder and fitting against the outer edges of said bars, yielding means for imparting reverse endwise movement to said bars to cause said jaws to engage and clamp the printing plate firmly to the cylinder, and cam bars for reversing such movement of the first-named bars to effect the release of the printing plate and to cause said first-named cams to move as wedges under the push plates and force the same outwardly to dislodge the printing plate from the cylinder.

3. In an address printing machine, a rotatable carrier, means for fitting an address printing form flatly on the carrier, a pair of bars arranged side by side and extending slidingly through and mounted upon said carrier and each provided with an inwardly-facing jaw, yielding means for imparting reverse endwise movement to said bars to cause said jaws to engage and clamp a printing form firmly to the carrier, fixed or stationary cam bars for reversing the movement of the first-named bars to effect the release of the printing form, a receiving magazine for the printing forms released from the carrier, and means to stack the forms edgewise in a horizontal column, in the said magazine.

4. In an address printing machine, a rotating cylinder, means for fitting an address printing plate flatly on the cylinder, a pair of bars arranged side by side, mounted upon and extending slidingly through the cylinder, and each provided with an inwardly facing jaw and an outwardly facing cam, radially movable push plates carried by the cylinder and fitting against the outer edges of said bars, yielding means for imparting reverse endwise movement to said bars to cause said jaws to engage and clamp the printing plate firmly to the cylinder, cam bars for reversing such movement of the first-named bars to effect the release of the printing plate and to cause said first-named cams to move as wedges under the push plates and force the same outwardly to dislodge the printing plates from the cylinder, and yielding means for withdrawing the push bars to normal position after the first-named yielding means has again reversed the operation of said first-named bars.

5. In an address printing machine, a rotatable carrier provided with circumferential openings and end openings, means for fitting a printing form flatly upon the circumferential portion of the carrier so that portions of the form shall fit in one of said circumferential openings, a pair of bars mounted upon and extending slidingly through said carrier and the end openings thereof, and provided with inwardly-facing cam or beveled jaws projecting into said circumferential opening into which the form projects, yielding means for causing said bars to apply pressure through their said jaws, upon the portions of the form within said opening to clamp the said form firmly to the carrier, and fixed cams to reverse the movement of said bars to effect the release of said form.

6. In an address printing machine, a rotating cylinder provided with openings in its circumferential portion and with end openings, means for fitting a printing plate flatly upon the circumferential portion of the cylinder, said plate having inwardly projecting end ribs to fit in the peripheral openings of the cylinder and said ribs being provided in their outer sides with V-shaped grooves, a pair of bars mounted upon and extending slidingly through the cylinder and the end openings thereof and provided with inwardly facing jaws projecting outwardly into said peripheral openings and with outwardly facing cams, push plates fitting in said peripheral openings inwardly of the said ribs of the printing plate and provided with legs fitting against opposite sides of the said pair of bars, springs for holding said push plates repressed, yielding means for causing the bars to slide to insert their jaws into the grooves of the printing plate to clamp the latter firmly to the cylinder, and fixed cams to reverse the movement of said bars to effect the withdrawal of said jaws from engagement with the printing plate and to cause the movement of the cams of said bars against the push plates to force the latter outward to dislodge the printing plate from the cylinder.

7. In an address printing machine, a rotatable carrier, means for fitting an address printing form flatly on the carrier, a pair of bars fitting flatly together and mounted slidingly in the carrier, and provided with inwardly-facing jaws, means to operate the bars to dispose their jaws sufficiently apart to receive the printing form between them, yielding means to reverse the movement of said bars to cause their jaws to engage and clamp the form firmly to the carrier, means to move the bars in the same direction they were first moved but a greater distance, and means actuated by the said bars in their last movement, to dislodge the printing form from the carrier.

8. In an address printing machine, a rotating cylinder provided with openings in its circumferential portion and end openings, a pair of bars fitting flatly together mounted upon and extending through the cylinder and the end openings thereof, and provided with jaws projecting outward into said peripheral openings and with outwardly projecting cams, radially movable push plates within the cylinder and upon said bars, yielding means for holding said push plates at their inward limit of movement, fixed cams for imparting movement to said pair of bars to cause the jaws thereof to move apart to permit a printing plate to be fitted upon the cylinder between them, yielding means for reversing the operation of said bars and said jaws to cause the latter to engage and clamp the printing plate upon the cylinder, and a second pair of cam bars to move the bars in the same direction as they were moved by the first named bars for a greater distance and thereby effect the disengagement of the jaws from the printing plate and to cause movement of the cams on said bars under the push plates to force the latter outwardly to dislodge the printing plate from the cylinder.

9. In an address printing machine, a rotary form carrier, a support for holding a column of printing forms radially and adjacent to the periphery of the carrier to feed them flatwise toward the carrier, means on the carrier actuated to periodically project beyond the periphery of the carrier to engage the nearest printing form and force it edgewise from under the remaining forms, a pair of jaws for gripping the form from opposite sides to hold it on the carrier, and means to withdraw the said form-forcing means to normal position.

10. In an address printing machine, a rotary printing carrier, a support for holding a column of printing forms radially and adjacent to the periphery of said carrier to feed them flatwise toward the latter, means projecting from the carrier beyond the periphery thereof to engage the lowermost printing form and force it edgewise from under the remaining forms, a pair of jaws for gripping the form from opposite sides to hold it on the carrier, and yielding means to withdraw the said projecting means inward of the printing plane of the carrier.

11. In an address printing machine, a rotary printing carrier, a support for holding printing forms and feeding them flatwise to a position adjacent the carrier, means carried by the carrier for engaging the bottom form in the support, and forcing it edgewise from under the support, yielding means for holding the form-forcing means normally withdrawn to inoperative position, fixed cams for forcing said form-forcing means beyond the periphery of the carrier to cause said forcing means to engage and force the bottom form from under the remaining forms, means for applying the withdrawn form in printing position to the periphery of the carrier and a pair of jaws for gripping the form from opposite sides to hold it on the carrier.

12. The combination with a rotating cylinder for printing addresses, of a platen, means for guiding a continuously driven web of paper over the platen at the side thereof adjacent the cylinder, means for guiding an inking ribbon over the platen between the paper and cylinder, rotating means for printing matter upon the paper adjacent each address printed thereon, rotating means for printing matter upon the opposite side of the web of paper, and means for severing the paper below said printed matter without interfering with the travel of the paper.

13. In an address printing machine, the combination with a rotatable print-form carrier and a support for printing-forms to be fed to and secured flatly on the carrier, of springs secured to opposite sides of the support adjacent the periphery of the carrier and extending substantially parallel with said periphery and projecting at their free ends beyond one side of the support, a pair of springs disposed above and close to the said projecting portion of the first-named springs and secured at one end to the support and projecting at the other end beyond the free end of said first-named springs, and means on the carrier for successively sliding forms from under said support and between said springs to the free ends of the said first-named springs; said upper springs being adapted as the forms successively attain the positions last-mentioned, to press said forms inwardly and flatly against the circumference of the carrier.

14. In an address printing machine, the combination of a rotatable printing-form carrier, means for holding printing forms adjacent the carrier, automatic means mounted on said carrier for periodic projection from a plane inward of to a plane outward of the impression or printing plane of a form when on the carrier, whereby said means shall successively transfer printing forms from the printing-form holding means to the carrier, and springs extending convergingly toward the periphery of the carrier to coöperate with the said automatic means in positioning the forms upon the carrier.

15. In an addressing and printing machine, a rotary printing-form carrier, a support for holding and feeding printing-forms to a position adjacent the carrier, means carried by the carrier for periodic projection beyond the periphery thereof to engage the nearest printing-form in and force it out of the support, yielding means for applying the withdrawn form in printing position on the carrier, gripping jaws for engagement with the form to hold it on the carrier, and means for withdrawing the projection means before the forms attain the position in the revolution of the carrier, where the printing operation occurs.

16. In an address printing machine, a rotatable printing-form carrier, provided with openings in its ends, a bar extending through the carrier and said openings thereof and provided at one end with a notch in its inner edge, a plurality of pins slidingly mounted on said bar and adapted to be projected beyond the printing plane of the carrier by outward movement of the bar and withdrawn by inward movement of the same, means for effecting inward movement of the bar, a pair of fixed or stationary cams for effecting outward movement of the bar, once in each revolution of the carrier, one of said cams being adapted to enter the notch in said bar when the latter is moved to withdraw it from engagement with the other cam and thereby prevent outward movement of said pins, and means to secure said bar against movement from or into coöperative relation with said cams.

17. The combination of a rotary printing form carrier, a support for printing forms to be used on said carrier adjacent thereto, a plurality of devices carried by the carrier adjustable to operative position whereby each shall once in each revolution effect the transfer of a printing form from said support onto the carrier or if adjusted to inoperative position shall pass said support without effecting the transfer operation, and means carried by the rotary carrier and associated with each of said devices for automatically clamping to the carrier the printing form transferred thereto by the associated transfer devices.

In testimony whereof, I affix my signature, in the presence of two witnesses.

CLARENCE E. BOWER.

Witnesses:
S. S. ABBOTT,
JNO. W. LOCKE.